United States Patent [19]

Jacquet

[11] Patent Number: 4,479,668
[45] Date of Patent: Oct. 30, 1984

[54] BENT TUBE AND TUBE ASSEMBLY, PARTICULARLY FOR CONNECTING A HEAT-EXCHANGER TO A CIRCUIT

[75] Inventor: Maurice Jacquet, Maurepas, France

[73] Assignee: Valeo, France

[21] Appl. No.: 276,659

[22] Filed: Jun. 23, 1981

[30] Foreign Application Priority Data

Jul. 1, 1980 [FR] France .................................. 80 14662

[51] Int. Cl.³ ............................................. F16L 39/00
[52] U.S. Cl. ................................ 285/137 R; 165/178; 285/179; 285/188
[58] Field of Search ................... 285/137 R, 188, 182, 285/179; 165/178, 171

[56] References Cited

U.S. PATENT DOCUMENTS

| | | | |
|---|---|---|---|
| 2,151,540 | 3/1939 | Varga | 165/178 X |
| 2,560,114 | 7/1951 | Kennon | 285/182 X |
| 3,372,739 | 3/1968 | Kastovich et al. | 165/171 X |
| 3,595,309 | 7/1971 | Hawkins | 165/178 X |
| 3,805,881 | 4/1974 | Kenrick et al. | |
| 4,018,979 | 4/1977 | Young | 285/179 X |
| 4,172,496 | 10/1979 | Melnyk | 165/178 X |
| 4,213,640 | 7/1980 | Miles | 285/188 X |
| 4,235,281 | 11/1980 | Fitch et al. | 165/171 X |

FOREIGN PATENT DOCUMENTS

| | | |
|---|---|---|
| 1261715 | 2/1968 | Fed. Rep. of Germany . |
| 1566140 | 5/1969 | France . |
| 644243 | 10/1950 | United Kingdom . |
| 1566599 | 5/1980 | United Kingdom ............ 285/137 R |

Primary Examiner—Thomas F. Callaghan
Attorney, Agent, or Firm—Wigman & Cohen

[57] ABSTRACT

This invention relates to tubes and tube assemblies of plastics material, particularly for connecting heat-exchangers to circuits. Each tube comprises at least one median section, with ends respectively connected by elbows to an inlet section and an outlet section. Each tube consists essentially of two moulded pieces tightly joined to each other along a parting plane which is chosen so as to cut the median section into two parts along its longitudinal axis. At least one of the two moulded pieces comprises at least one of the inlet and outlet sections.

6 Claims, 3 Drawing Figures

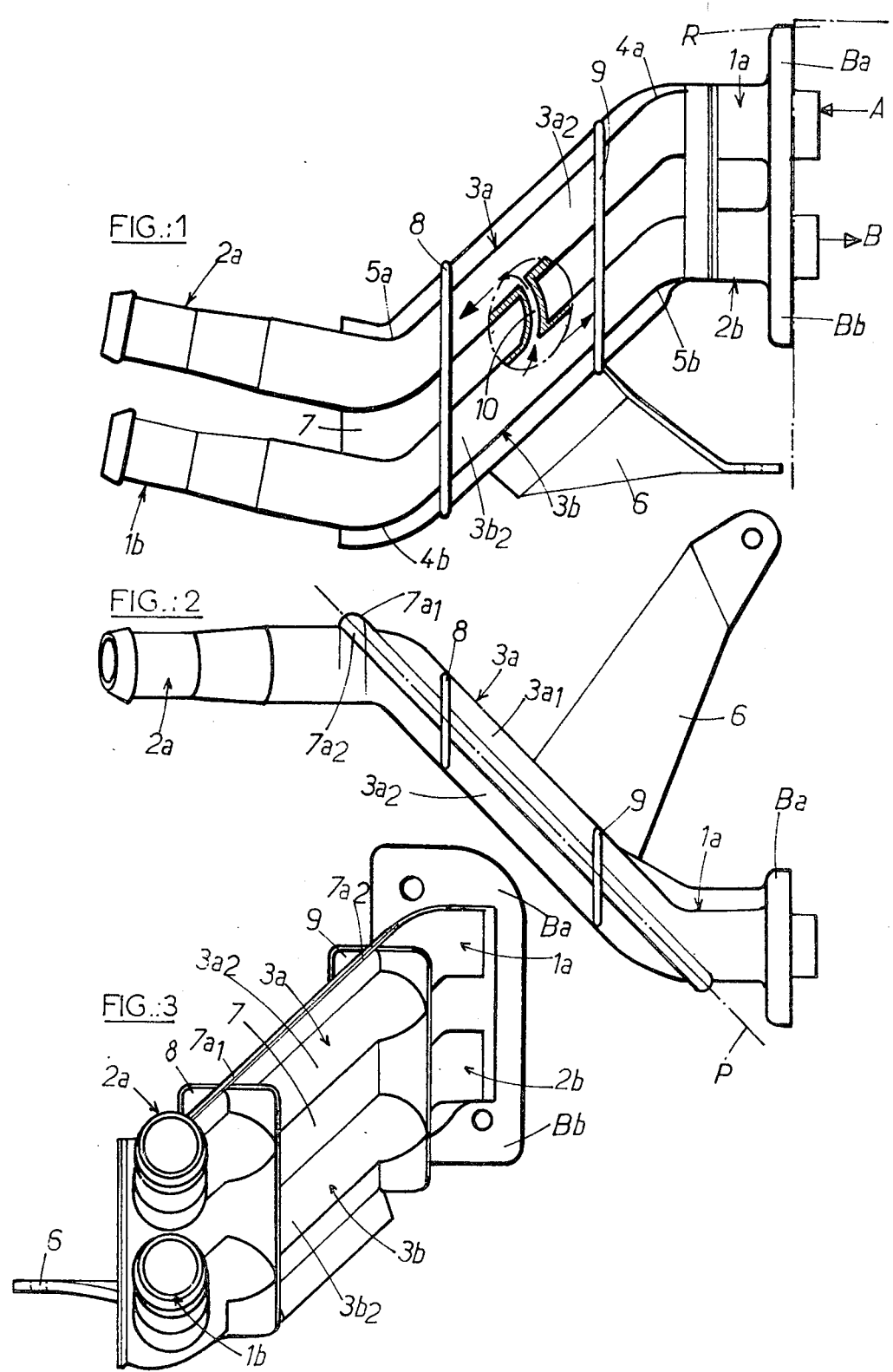

BENT TUBE AND TUBE ASSEMBLY, PARTICULARLY FOR CONNECTING A HEAT-EXCHANGER TO A CIRCUIT

The present invention relates to a tube, comprising at least two elbows, particularly for connecting a heat-exchanger to a circuit.

For many applications, particularly in air-conditioning plants, tubes comprising two elbows or even more than two elbows are needed for transporting liquids. Hitherto these bent tubes have been manufactured by one of the following processes:

(1) Starting from a rectilinear metal tube, for example of aluminium, steel or brass, the elbows required are formed by bending. The metal bent tube thus obtained, however, needs for its coupling, for example, to a radiator, a joint, a collar, screws and, sometimes, holding brackets. These metal bent tubes are therefore costly and, besides, of relatively high weight.

(2) Two tube sections are made by injection moulding, each comprising a single elbow; it is impossible, in fact, to mould a unitary tube, comprising two or more elbows, since one cannot use more than two pins for the removal from the mould. The two tube sections are then tightly joined, which raises assembly and tightness problems. Thus, tubes, having multiple elbows, manufactured by this process, are costly and may sometimes show sealing faults. Besides, this injection moulding process for single elbow tube sections shows the following shortcoming: with respect to removal from the mould, it is only possible to round off the concave part of the inner duct of the elbow; on the other hand, its convex part necessarily possesses a sharp edge, resulting in a reduction of the outflow section at the level of the elbow, which gives rise to a major pressure drop through the tube.

(3) A tube, comprising at least two elbows, can be manufactured in plastics material by a single blow extrusion operation; however, this single operation does not enable the fixing clamps and the connecting collars, which the tube has to comprise, to be produced at the same time. Their production requires subsequent operations, which increase the cost price.

The present invention enables a plastics tube to be produced, which comprises at least two elbows and does not possess any of the shortcomings of those manufactured by the three above-mentioned processes. The tube according to the present invention essentially comprises two moulded pieces, tightly joined to each other along a parting plane, chosen so as to cut the median section of the tube into two parts along its longitudinal axis.

The plastics tube according to the present invention shows the following numerous advantages; its two constituent pieces can be produced by injection moulding and then perfectly tightly joined to each other by glueing, by a catch or, preferably, by welding, for example by friction, by ultrasonic energy, etc.. The use of a plastics material enables a major gain in weight to be made, compared to a metal tube of the same dimensions. It is easy to design the two moulded pieces so as to avoid any sharp edge at the level of the elbows of the tube and thus to obtain perfect regularity of its section, leading to a reduction of the pressure drop. Moreover, the inlet and outlet sections of the tube according to the present invention can be given any direction in relation to that of the axis of its median section as well as in relation to the parting plane of the two pieces, of which it consists. It is clear that, if the components of the circuit and of the heat-exchanger, to which the inlet and outlet sections of the tube according to the present invention have to be respectively connected, also consist of plastics material, the corresponding connections can also be produced by glueing or, preferably, by welding, which avoids resorting to the use of conventional joints, the numerous shortcomings of which are known.

In a particular embodiment of the invention, the tube comprises at least three elbows, approximately located in the same plane, chosen as the parting plane for the two pieces, of which it consists, and the axis of at least one of the inlet and outlet sections of the tube may be situated outside that plane. The present invention therefore enables multiple elbow tubes to be produced, which show the numerous above-mentioned advantages.

The present invention also enables assemblies of two parallel tubes to be produced, each of which comprises at least two elbows, such an assembly being particularly designed for use at the inlet and at the outlet for the liquid in a radiator. This tube assembly essentially comprises two moulded pieces, each of which has the corresponding parts of the median sections of the two tubes and at least one planar rib, joining said parts of the median sections, along the parting plane, said two pieces being tightly joined to each other along their respective planar ribs.

A two tube assembly, adapted for use, at the inlet and at the outlet for the liquid in a radiator, is described below and diagrammatically illustrated in the attached drawing.

FIGS. 1 and 2, respectively, are a side view and a plan view of this assembly of two tubes.

FIG. 3 is a view in perspective of same.

In the assembly of two tubes, which is illustrated by way of example, each tube comprises a liquid inlet section, $1a$ or $1b$, and a liquid outlet section, $2a$ or $2b$. In fact, as the liquid passes through the two tubes in the reverse direction, as the arrows A and B indicate, (FIG. 1), the sections $1a$, $2b$, on the one hand, and $2a$, $1b$, on the other hand, are located on the same side of the assembly. The inlet section, $1a$ or $1b$, and the outlet section, $2a$ or $2b$, of each tube are connected to a median section, $3a$ or $3b$, respectively, by two elbows, $4a$ or $4b$ and $5a$ or $5b$. The end parts of the two sections $1a$ and $2b$ are respectively equipped with collars, $Ba$ and $Bb$, made in one piece, which serve for the connection of the tube assembly to the radiator, which has been diagrammatically indicated and designated by R. The median section, $3a$ or $3b$, of each of the two tubes is rectilinear, i.e. its longitudinal axis itself is rectilinear; the same applies to the two inlet and outlet sections, for example $1a$ and $2a$, of the same tube, but this latter feature is optional.

According to the present invention, each of the two tubes of the assembly under consideration consists essentially of two moulded pieces, tightly joined to each other along a parting plane P (FIG. 2), which has been chosen so as to cut the median section, $3a$ or $3b$, of the tube into two parts, $3a_1$ and $3a_2$ or $3b_1$ and $3b_2$ ($3b_1$, being FIG. 3, behind $3b_2$, is not visible); each of the two pieces comprises, one the inlet section $1a$ or $1b$, and the other the outlet section, $2a$ or $2b$, of the tube, integral with the corresponding part, $3a_1$, $3a_2$, $3b_1$, or $3b_2$, of its median section, $3a$ or $3b$.

The procedure for manufacturing the assembly of two tubes, which is illustrated in the attached drawing, is to start with the injection moulding of the following two pieces, separately, in plastics material: a first piece, comprising, on the one hand, parts $2a$ and $3a_2$ of one of the tubes and, on the other hand, the corresponding parts $1b$ and $3b_2$ of the other tube as well as a rib, approximately planar, joining said parts $3a_2$ and $3b_2$ of the median sections, $3a$ and $3b$, of the two tubes, along the parting plane P; a second piece, which comprises parts $1a$ and $2b$, joined by their collars in one piece, $Ba$ and $Bb$, as well as the two parts $3a_1$ and $3b_1$ of the median sections, $3a$ and $3b$, of the two tubes, similarly joined to each other along the parting plane P, by a planar rib, from which a fixing clamp 6 comes out in a plane at right angle to said planar rib. In the embodiment under consideration, the two pieces just mentioned respectively possess, along their parting plane P, planar rims, such as $7a_1$, $7a_2$ (FIG. 2), which can be placed on each other. The two pieces, after moulding, are then placed on each other at the level of their respective planar ribs, in such a way that the planars rims, such as $7a_1$ and $7a_2$, of the two parts, such as $3a_1$ and $3a_2$, of the median section, $3a$ or $3b$, of each tube are placed on each other and the two pieces are tightly joined to each other along their surfaces, placed in mutual contact, by glueing, by a catch or, preferably, by welding, for example by friction, by ultrasonic energy or by some other suitable process. The two planar ribs, placed on each other at the level of the parting plane P, then form a single rib 7, joining the two tubes at the level of their respective median sections $3a$ and $3b$. As can be seen in the view in perspective of FIG. 3, the rigidity of the assembly, formed by the two tubes, can be further improved by providing transverse ribs 8 and 9, i.e. at right angles to the parting plane P.

In the embodiment under consideration, the two injection-moulded pieces, moreover, are designed so that, after their connection, for example by welding, they define a by-pass duct 10 (FIG. 1), establishing communication for the median sections, $3a$ and $3b$, of two tubes. This kind of by-pass duct offers the advantage of reducing the difference in the temperatures of the water at the inlet and at the outlet of the radiator R.

In the illustrated embodiment, the two tubes have transverse internal and circular external sections; however, they could have other shapes. Moreover, the sections of tubes, located on the same side of the assembly, for example $2a$ and $1b$, are rectilinear and their axes are parallel. As a variant, their axes might not be parallel and could even be curved. The same applies to the two other tube sections $1a$ and $2b$. It is understood that the tube assembly according to the present invention, described above, can be attached to the radiator R, by welding of its collar $Ba$, $Bb$; this connecting process, which avoids the use of a joint, is very advantageous to the extent that, on the one hand, it ensures perfect tightness and, on the other hand, it is very economical.

The present invention is not limited to the embodiment described. It includes all its variants. It does not only enable assemblies of at least two approximately parallel tubes to be produced, such as that described above, but, furthermore, it also enables a single tube to be produced, with the same advantages, comprising at least two elbows and, possibly, more than two elbows, located approximately in the same plane, chosen as the parting plane. In the case of a tube with three elbows, for example, this comprises two intermediate sections; joined by an elbow, the respective longitudinal axes of which lie in the parting plane, while the longitudinal axis of at least one of the inlet and outlet sections of the tube may lie outside that plane. Finally, the inlet section and the outlet section of each tube according to the invention, instead of being respectively in one piece with the two moulded pieces, as in the example of the illustration, can both be in one piece with a single one of the two moulded pieces.

I claim:

1. A tube of plastic material for connecting a heat-exchanger to a circuit, said tube comprising at least one inlet section, one outlet section and one median section, said inlet and outlet sections integrally connected by elbows to opposite ends of said median section, said tube consisting essentially of two molded pieces, tightly joined to each other along a straight parting plane which extends through said median section and elbows along the longitudinal axis of the median section, one of said molded pieces comprising one part of said median section, a part of one of the elbows, and the entirety of said inlet section, the other of said molded pieces comprising the other part of said median section, a part of another elbow, and the entirety of said outlet section.

2. A tube according to claim 1, in which accessories selected in the group comprising fixing brackets and fixing flanges, are integral with at least one of the two pieces of the tube.

3. A tube according to claim 1, in which said two pieces respectively have along their parting plane, planars rims, which are placed on each other and by which the two pieces are tightly joined by one of the group of fixing means comprising glueing, catching means and welding.

4. A tube according to claim 1, which comprises at least three elbows, located approximately in the same plane, chosen as the parting plane, and the longitudinal axis of at least one of the inlet and outlet sections of the tube lies outside said plane.

5. An assembly of two parallel tubes for use at the inlet and at the outlet for the liquid in a radiator, each tube comprising one inlet section, one outlet section and one median section, said inlet and outlet sections being integrally connected by elbows to opposite ends of said median section, said tubes consisting essentially of two molded pieces, tightly joined to each other along a straight parting plane which extends through the median sections of the two tubes and at least one planar rib along the longitudinal axis of the median section, one of said molded pieces comprising one part of each of said median sections, portions of two of said elbows, and the entirety of two of said inlet and outlet sections, the other of said molded pieces comprising the other part of said median sections, portions of two of said elbows, and the entirety of two of said inlet and outlet sections.

6. A tube assembly according to claim 5, in which accessories, selected in the group comprising fixing and connecting flanges for the radiator are integral with said two pieces.

* * * * *